Feb. 28, 1961    R. J. KAZYAKA    2,973,009
FUEL CONTROL VALVE OF A MISSILE SYSTEM
Filed July 23, 1959

INVENTOR.
R. J. Kazyaka
BY
S. J. Rotondi, A. J. Dupont & E. C. Gott

United States Patent Office 2,973,009
Patented Feb. 28, 1961

2,973,009
FUEL CONTROL VALVE OF A MISSILE SYSTEM

Raymond J. Kazyaka, Scotia, N.Y., assignor to the United States of America as represented by the Secretary of the Army Filed July 23, 1959, Ser. No. 829,166

1 Claim. (Cl. 137—554)

This invention relates to a fuel valve of the sleeve type and more specifically to a servo-motor operated fuel valve.

The fuel valve of this invention is adapted to be used in a missile system and is located in the fuel line directly between the turbo-pump and rocket motor combustion chamber. The valve is of the sleeve type in which the sleeve is slidable in the fuel line and is operative to control the outflow into a plurality of discharge lines. The sleeve is urged in a closed direction by a spring and carries interiorly thereof a fixed piston. An actuating fluid is admissible between the fixed piston and sleeve end face to move the sleeve to open position.

It is an object of the invention to provide a sleeve valve for a fuel line having a single inlet and a plurality of outlets.

Another object of the invention is to provide a sleeve valve in which only the annular area of the sleeve is subjected to line pressure.

Another object of the invention is to provide a sleeve valve in which the sleeve forms the cylinder of a fixed piston, movable cylinder servo-motor.

Still another object of the invention is to provide a valve having micro-switches which indicate whether the valve is open or closed.

These and other objects will become more apparent when reference is had to the following detailed description and drawing in which.

Figure 1:
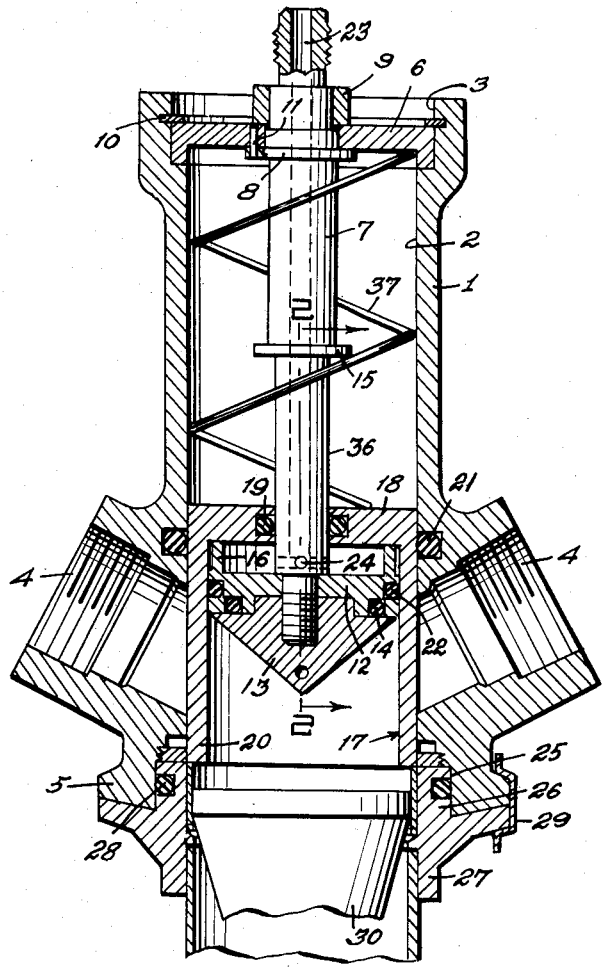
Figure 1 is an axial sectional view of the valve.

With reference to the drawing, and particularly to Figure 1 the valve is provided with the body 1 having the bore 2 and counterbore 3. At its forward end the body is provided with a plurality of circumferentially spaced outlets 4 and is provided with the flange 5. Mounted within the counterbore 3 in the valve body by means of snap ring 10 is the centrally apertured disk 6. A shaft 7 having a reduced end 36 and a first flange 8 which is received in the central aperture of the disk and connected thereto by means of the nut 9. The taper pin 11 holds the shaft 7 and disk 6 against relative rotation. The piston 12 having axial flange 16 is connected to the reduced front end 36 of shaft 7 by means of the conical nut 13 with sealing ring 14 secured between the nut and piston.

The shaft 7 is provided with a second intermediate flange 15 and slidably mounted on the shaft is the cup shaped valve member 17. The cup shaped valve member 17 has the end wall 18 which is slidably mounted on the reduced end 36 of shaft 7 and carries the O-ring seal 19 so as to be fluid tight with the shaft. The valve member 17 also has the sleeve portion 20 which slides within the body bore 2 and is sealed with respect thereto by the O-ring seal 21. The sleeve in the position shown in Figure 1 is effective to close the outlets 4. The inner surface of the sleeve 20 slidably engages the piston 12 and is sealed against fluid leakage by O-ring seal 22.

The shaft 7 is provided with longitudinal passage 23 and radial passages 24 communicating with longitudinal passage 23 and leading into the space between the piston 12 and valve end wall 18. The coil spring 37 urges the valve member 17 toward closed position.

The forward end of valve body 1 is provided with bore 25 which receives the pilot end 26 of flanged inlet pipe 27. The pilot end 26 of the inlet pipe is provided with O-ring seal 28 and the inlet pipe and valve body are connected together by conventional clamp means 29. The filter 30 is mounted in inlet pipe 27 to strain impurities from the fuel.

When it is desired to open the valve fluid pressure is applied to passageway 23 in shaft 7 and then through radial passages 24 between the fixed piston 12 and end wall 18. This is effective to slide the valve member 17 against the action of spring 37 so that the sleeve uncovers outlet ports 4. Upon release of said fluid pressure the spring 37 acts to close the valve. It will be seen that since only the projected area of the sleeve portion 20 of the valve member is subjected to inlet pressure the spring 37 may be relatively light. The small area of the valve member 17 which is subjected to inlet pressure also reduces the tendency of the valve to hammer when closed. The conical configuration of the nut 13 is effective to produce smooth flow in the valve.

Figure 2:
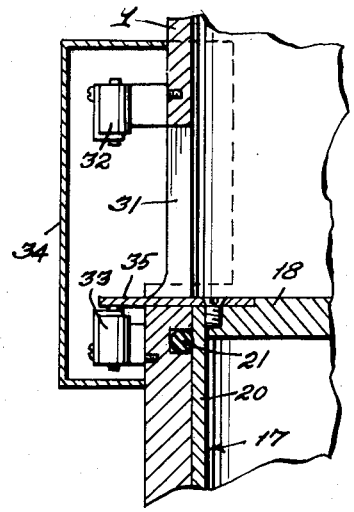
Figure 2 is a partial sectional view taken on the line 2—2 of Figure 1 showing the micro-switch arrangement.

The valve of the present invention is provided with indicating means to provide a signal when the valve is in the open and closed position. As shown in Figure 2 the valve body 1 is slotted at 31 and has the micro-switches 32 and 33 connected thereto at the ends of the slot. A protective housing 34 is connected to the body 1 and encloses the switches. The end wall 18 of valve member 17 has connected thereto the plate 35 which projects through the slot 31. When the valve is fully open the plate closes switch 32 and when fully closed the plate closes switch 33. The switches may be connected in circuit with any suitable indicating or signalling means.

While I have shown and described but one specific embodiment of my invention, it will be obvious that various modifications in construction and arrangement may be made without departing the scope of my invention as defined in the appended claim.

I claim:

A valve comprising a body having an axial bore, an inlet and a plurality of substantially radial outlets, a shaft fixed to said body and disposed in said bore, a piston connected to said shaft, a valve member having a sleeve portion, the interior surface of which is slidable on said piston and the exterior surface of which is slidable in said body bore, said valve member also having an end wall, passageways in said shaft to admit fluid between said piston and valve member end wall to move said valve member in one direction, spring means for moving said valve member in the opposite direction and means for indicating the fully opened and closed positions of said valve, said means including a plate carried by said sleeve portion of said valve, a pair of spaced switches carried by said body, said plate being adapted to contact one of said switches when in the said fully open and said fully closed positions respectively.

References Cited in the file of this patent

UNITED STATES PATENTS

| | | |
|---|---|---|
| 1,919,165 | Kinzie | July 18, 1933 |
| 2,085,982 | Johnson | July 6, 1937 |
| 2,928,646 | Ashbrook | Mar. 15, 1960 |
| 2,929,605 | Wolff | Mar. 22, 1960 |

FOREIGN PATENTS

| | | |
|---|---|---|
| 701,212 | Germany | Jan. 11, 1941 |
| 813,386 | Germany | Sept. 13, 1951 |